United States Patent Office 3,535,355
Patented Oct. 20, 1970

3,535,355
PROCESS FOR PRODUCING DERIVATIVES OF
WEAKLY ACIDIC CHEMICAL COMPOUNDS
William L. Jolly, El Cerrito, Calif., Thomas Birchall,
Hamilton, Ontario, Canada, and Douglas S. Rustad,
Kingston, Jamaica, assignors to the United States of
America as represented by the United States Atomic
Energy Commission
No Drawing. Filed May 10, 1968, Ser. No. 728,348
Int. Cl. C07j 9/28, 15/00, 15/02
U.S. Cl. 260—429                                    9 Claims

ABSTRACT OF THE DISCLOSURE

Process wherein a solid alkali metal or an alkaline earth metal hydroxide is contacted with a weak acid chemical compound dissolved in a non-hydroxylic solvent to produce a deprotonated intermediate anion of said compound in solution, in said solvent. Thereafter a reagent which is characterized by having a displaceable substituent group is added to the intermediate solution to produce derivatives of said weak acid compound and the compound is recovered from the solution.

BACKGROUND OF THE INVENTION

This invention was made in the course of, or under, Contract W-7405-ENG-48 with the United States Atomic Energy Commission.

FIELD OF THE INVENTION

The invention relates, generally, to a process for preparing derivatives of weak acid compounds and, more particularly, to a process for producing derivatives of weak acid and extremely weak acid compounds wherein a solution of said weak acid in a non-hydroxylic solvent is contacted with a solid alkali metal hydroxide or alkaline earth metal hydroxide to produce a deprotonated intermediate anion of said weak acid which intermediate is then reacted with still another material to yield said weak acid derivative.

Photonic acids have, at least in the case of the stronger acids, been heretofore employed in solutions for preparing various derivatives, such as salts, by reactions which involve the removal of a proton and replacement of the proton with another substituent. However, in the case of weak and extremely weak protonic acids, when water is employed as the reaction medium or the medium is otherwise an aqueous or other hydroxylic type solvent, many reactions proceed substantially not at all or to only a very limited extent. The difficulty arises in that water in water is an abnormally strong acid and therefore ionization or removal of a proton from the weak acid is suppressed or prevented. The explanation which has been offered for this behavior is that the hydroxide ion is abnormally strongly stabilized in water by hydrogen bonding. If it were not for the unusual stability of the hydroxide ion in water, it would be expected that the ionization or dissociation constant, pK, of water in water, which is a measure of the acidity, would be about 28. This value is consistent with findings that the nuclear magnetic resonance shift for hydroxide ion is 13 p.p.m. to higher field as compared to hydroxide ion in water.

In liquid ammonia, which is a much more basic solvent than water, normal protonic acids have ionization constants, which are about $10^{10}$ times larger than the ionization constants in water. In contrast therewith, the pK of water in liquid ammonia is 18 while the pK of water in water is 16. Thus, in liquid ammonia, the ionization constant of water is most surprisingly found to be 100 times smaller in ammonia than it is in water. Other acids whose anions are strongly hydrogen bonded in water show anomalous differences of a lesser degree in their relative pK values in water and ammonia. Moreover, dimethyl sulfoxide ("DMSO") and water have similar basicities so that one would expect normal acids to have similar ionization constants in these two solvents. However, the ionization constants of carboxylic acids and bisulfate ions are $10^{-6}$ to $10^{-7}$ times smaller in DMSO than in water. These anomalies are explainable in terms of pronounced stabilization of the anions in water by hydrogen bonding. It is therefore clear that the acidities of hydroxylic acids and normal acids can be meaningfully compared only when all of the acidities are those applicable to the same non-hydroxylic solvent.

DMSO and certain equivalent solvents have heretofore been employed for conducting a variety of reactions between solutes. For example, base-catalyzed reactions such as the Wolff-Kishner reduction and Cope elimination have been so conducted.

The intrinsic basicity of the hydroxide ion is much greater than that which can be achieved in a hydroxylic solvent such as water or alcohol. Unfortunately, hydroxides are not appreciably soluble in non-hydroxylic solvents so that provision of an alkali metal hydroxide or alkaline earth metal hydroxide as a solute in such a solvent to react as a base is precluded. This difficulty has been overcome in certain instances, heretofore, by utilizing potassium t-butoxide which has an appreciable solubility in solvents such as, DMSO, as disclosed by D. J. Cram et al., J. Am. Chem. Soc., 82, 6412 (1960). Accordingly, there exists an evident need for a reaction system in which the inherently strong intrinsic basicity of the hydroxide ion may be more effectively and universally utilized.

SUMMARY OF THE INVENTION

Now it has been discovered that solid alkali metal hydroxides and alkaline earth metal hydroxides will react with weak acids when contacted directly with a solution of a weak acid in a non-hydroxylic solvent so as to remove a proton therefrom yielding an anion of the weak acid as a highly reactive intermediate together with a cation of the aforesaid metal hydroxide in the solution. In order for the reaction to proceed the selected alkali metal hydroxide or alkaline earth metal hydroxide material is fragmented or ground to a finely-divided state so as to obtain effective intimate contact with the solution. The finely-divided hydroxide material is then contacted with the solution of the weak acid as by stirring in an intimately admixed slurry mixture. In general, subsequent to completion of the deprotonation reaction or in some instances, concurrent therewith, a selected reagent is introduced to react with or otherwise interact with the intermediate anion formed in the solution to yield a derivative thereof which derivative is thereafter recovered from the solution.

The use of solid dry metal hydroxide in conducting the reaction is highly beneficial since it has been found that in this state the hydroxide is in effect a much more basic reagent that would be expected from the behavior in usual solutions. In this fashion it is possible to conduct many syntheses not heretofore possible or to conduct a highly facilitated synthesis of compounds which have heretofore been accomplished by other more laborious and expensive procedures, as well as to produce compounds which may not be synthesized by known procedures. In addition to serving as an effective reagent to effect deprotonation, the solid metal hydroxide can also serve a secondary beneficial purpose in that this reagent effectively removes significant amounts of water, if present in the solvent or reagents or as produced in the reaction, to form a highly concentrated separate phase with residual solid metal hydroxide. Therefore the necessity of drying the solvent or reagents to minimize presence of hydroxylic solvent in the reaction mixture may be eliminated. This feature facilitates and promotes progress of the reaction. Also, the use of the solid alkali metal hydroxide or alkaline earth metal hydroxide permits use of certain metallic halide salts of hydrate form or having water of crystallization therein without the necessity of eliminating the water in a preliminary operation.

Accordingly, it is an object of the invention to provide a process for the production of derivatives of weakly acidic and extremely weakly acidic chemical compounds.

Another object of the invention is to provide a process for the production of derivatives of weakly acidic chemical compounds wherein a solution comprising the compound dissolved in a non-hydroxylic solvent is intimately contacted with a solid alkali metal or alkaline earth metal hydroxide to remove a proton therefrom to provide a reactive intermediate of said compound in said solution.

Still another object of the invention is to provide a process wherein a weakly acidic compound in solution in a non-hydroxylic solvent is contacted with solid alkali metal or alkaline earth metal hydroxide to form a reactive anion intermediate of the compound in the solution and a reagent is reacted with said intermediate to form a derivaitve of said weakly acidic compound.

Other objects and advantages features of the invention will be apparent in the following description.

DETAILED DESCRIPTION

In conducting the process of the invention it is important to note that, in a hydroxylic solvent such at water, alcohol, or even nonhydroxylic solvents containing significant amounts of water, the intrinsic basicity of the hydroxide ion is offset or negated so that hydroxide ion cannot serve as an effective agent for "deprotonating," i.e., removing ionizable hydrogen from weakly acid materials and especially from extremely weakly acid materials.

The intrinsic basicity of the hydroxide ion is actually much greater than that which can be achieved in a solvent such as water or alcohol. Hydroxides are not appreciably soluble in non-hydroxylic solvents. However, it has now been found that alkali metal and alkaline earth metal hydroxides need not be *dissolved* in non-hydroxylic solvents to bring about ionization, i.e., deprotonation of weak acids to a large and highly effective degree. For example, solid sodium hydroxide and potassium hydroxide are very effective in the preparation of salts of weak acids when used in this fashion. From readily available thermodynamic data, the following equilibrium constants can be calculated:

$$2KOH_{(s)} + H^+aq = K^+aq + KOH \cdot H_2O_{(s)} \quad K = 10^{31}$$

$$2NaOH_{(s)} + H^+aq = K^+aq + NaOH \cdot H_2O_{(s)} \quad K = 10^{23}$$

The foregoing thermodynamic data were taken from the National Bureau of Standards Circular 500 "Selected Values of Chemical Thermodynamic Properties," Washington, D.C. It was necessary to estimate the entropies of KOH and KOH·H₂O using the methods outlined by Latimer, "Oxidation Potentials," 2nd ed., Prentice-Hall, 1952. Cesium and rubidium hydroxides would be expected to have even more favorable dissociation constants. Lithium hydroxides would be relatively ineffective and alkaline earth hydroxides would be somewhat less effective than NaOH but still usable.

The overall reactions which occur in the foregoing operation using KOH and NaOH as examples, are shown by the following equations:

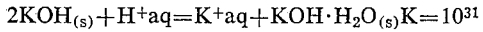
$$2KOH_{(s)} + HA = K^+ + A^- + KOH \cdot H_2OK = 10^{31-pKHA}$$

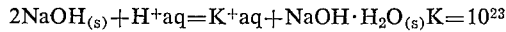
$$2NaOH_{(s)} + HA = Na^+ + A^-$$
$$+ NaO \cdot H_2O_{(s)} K = 10^{23-pKHA}$$

wherein HA is the weak acid and A⁻ is the anion of said weak acid. It will be noted that the H₂O formed in the deprotonation of the weak acid by combination with the OH of the KOH associates with the solid KOH phase in the system which K⁺ and the A⁻ remain in the solution.

The foregoing values of the equilibrium constants may be taken to indicate that any acid with an aqueous pK strength less than 31 should react with potassium hydroxide to form the potassium salt, and any acid with an aqueous pK strength less than 23 should react similarly with sodium hydroxide. However, such reactions cannot occur in aqueous or other hydroxylic solvents because it is not possible, for example, to have both KOH and KOH·H₂O in equilibrium with a solution which in the usual sense is *aqueous*. For determining which weak acid will react with a particular solid hydroxide in the process of the invention in the absence of relevant dissociation data, thermodynamic data which is generally applicable to aqueous solutions may be used as shown above noting that the free energy of transfer of a salt or a neutral species from water to another solvent is rather small, and so these reactions and their calculated equilibrium constants can be considered to be valid for any solvent.

The aqueous pK constant values for a few acids are presented in Table 1 and many more are available in the literature. The data in this table yields an idea as to the kinds of acids which will react with solid KOH and NaOH when dissolved in a non-hydroxylic solvent. For the purposes of the invention a weak acid may be characterized as a proton donor having a pK constant in the range of about 12 to at least about 31, wherein the procedure of the invention is generally most useful. Surprisingly, reactions sometimes proceed when the pK constant of the weak acid has a somewhat greater numerical value than that expected from considerations of the basicity constant of the alkali metal hydroxide or alkaline earth metal hydroxide. Although it has been calculated that KOH should only be able to deprotonate acids having aqueous pK values less than 31, it has been observed that even triphenylmethane (pK≈32.5) is at least 95% deprotonated using dimethylsulfoxide as the solvent for the triphenylmethane and its salt.

TABLE 1

Approximate pK scale for weak acids in aqueous solutions, pKa = −log Ka

| Acid: | pK (acid strength) |
|---|---|
| H₂S | 7 |
| CH₃NO₂ | 10 |
| H₂O | 16 |
| C₅H₆, cyclopentadiene | 16 |
| C₂H₅OH | 17 |
| 9-phenylfluorene | 19 |
| C₉H₈, indene | 20 |
| (C₆H₅)₂NH | 23 |
| Fluorene | 23 |
| CH₃CN | 25 |
| GeH₄ | 25 |
| C₆H₅NH₂ | 27 |
| PH₃ | 27 |
| C₂H₅GeH₃ | 28 |
| (C₆H₅)₃CH | 32 |
| NH₃ | 39 |
| C₆H₅CH₃ | 40 |

While the foregoing is illustrative of which weak acid may react with a solid alkali metal—or alkaline earth metal hydroxide in contact with the solution, it will be noted that in a non-hydroxylic solvent such as ether or dimethyl sulfoxide (DMSO), and therefore, in the absence of hydrogen bonding, acidities may be displaced or changed with respect to the order noted in water. For example, in water solution an alcohol such as ethanol (aqueous pK≈17) is intrinsically more acidic than acids such as indene (aqueous pK≈20) and diphenylamine (aqueous pK≈23) while in said non-hydroxylic solvent the reverse is true.

The solvents suitable for use in practicing the process of the invention are what are termed, for purposes herein, non-hydroxylic or non-aqueous solvents. Generally speaking the anion of the weak acid, at least, must be soluble in and the solvent must be inert to the reagents employed and not interact to suppress the basicity of the hydroxide ion. These considerations generally rule out solvents such as alcohols, ketones and others that may have an appreciable basic dissociation. More particularly, solvent suitable for use in the process of the invention are those characterized as donor solvents.

Non-hydroxylic donor solvents suitable for practice of the invention include fluid ethers exemplified by low molecular weight aliphatic ethers such as dimethyl, diethyl and methyl-ethyl ethers as well as fluid glycol ethers such as diglyme, i.e., diethylene glycoldimethyl ether as well as lower molecular weight glycol ethers including, e.g., dimethoxy-ethane ("DME") and diethoxy-ethane, ethoxy-methoxy-ethane. Dimethyl sulfoxide ("DMSO"), hexamethyl-phosphormamide, dimethyl formamide, and diethyl-formamide, are especially suitable. Solvents containing appreciable amounts of water can act as a hydroxylic or aqueous solvent to an extent which interferes with the desired reaction. In such an event the solvent is dried by conventional means or additional amounts of metal hydroxide are added, as described below, to serve as a concurrent drying agent.

For producing the deprotonated intermediate, the selected weak acid is dissolved or otherwise is dispersed in a suitable non-hydroxylic solvent of the character described. The solution is then contacted with finely-divided dry solid alkali metal or alkaline earth metal hydroxide. Usually a particle size of less than 0.5 mm. is preferred since a greater surface area and correlatively accelerated reaction rate is obtained therewith. Effective contact is obtainable merely by continuously stirring or agitating the solid metal hydroxide to form a slurry in the solution. The amount of metal hydroxide used is generally determined by the amount of acid to be deprotonated and is used in stoichiometric excess. For example, with KOH reagent grade (85% KOH) good results are generally obtained when the KOH powder is used in the proportion of 25 g. per 0.1 mole of weak acid; however, very weak acids such as triphenyl methane generally require a KOH/acid ratio two or three times as great. Acids of intermediate acidity require intermediate amounts of base. If the KOH or other alkali metal hydroxide or alkaline earth metal hydroxide is to serve as a drying agent for the solvent as well as a deprotonating agent, no less than 10 g. of KOH powder should be used per 100 ml. of solvent unless the solvent is carefully dried beforehand.

The amount of solvent used is generally dictated by the solubility of the potassium salt of the weak acid. However, even in the case of highly soluble potassium salts, the ratio of KOH or other alkali metal hydroxide or alkaline earth metal hydroxide to solvent should not be allowed to exceed about 80 g. to 100 ml.—otherwise the slurry will be too difficult to stir, and too large a fraction of the solution will be held back during subsequent filtration.

For laboratory synthesis, the reaction is conveniently carried out in a round-bottomed flask having a capacity about double the volume of the solvent. If less than 80 g. of KOH is used, a magnetic stirring bar is adequate; however, larger amounts of KOH require a paddle stirrer. Blendor type mixers of the type having an agitator—cutting blade in the bottom are also quite convenient. Often, the anion of the weak acid is susceptible to autoxidation, requiring that the reaction flask be sealed and that an inert atmosphere such as nitrogen, argon, helium, etc., be provided. This is easily accomplished by using a 3-necked, ground-glass stoppered flask, with one of the side necks connected to a source of nitrogen. The tubing leading to the source of nitrogen should be connected via a T-connection to a mercury bubbler set to maintain a pressure differential of 5–10 mm. Of course, equivalent larger batch apparatus may be employed in large scale syntheses.

In the case of a relatively strong acid such as cyclopentadiene, the solution of the acid is vigorously stirred with the KOH for about one hour. Weaker acids, such as fluorene and triphenylmethane (triphenylmethane and other very weak acids are deprotonated by KOH more effectively and rapidly in dimethyl sulfoxide) require 10–15 hours, or even longer, to effect complete deprotonation. The reaction may be conducted at ambient or lower temperatures; however, reaction time is not appreciably reduced in many cases by increasing the temperature. Temperatures in the range of 0° C.–100° C. may generally be used, with reflux of the solvent if necessary, unless the compound is degraded at higher temperatures. The rate and, in some cases, the extent of deprotonation are somewhat controllable by the choice of solvent. For example, it has been observed that some deprotonations proceed much more readily in dimethyl sulfoxide than in 1,2-dimethoxyethane. However, dimethyl sulfoxide can sometimes be disadvantageous because of its high viscosity, its low volatility, or its oxidizing power. In some instances it is not necessary to separate the intermediate solution from the KOH phase prior to reaction of the intermediate to produce the final derivative as shown below.

In any event for producing a derivative of the weak acid a suitable reagent is added to the intermediate solution. Reagents suitable for reacting with the anionic intermediate in the solution are generally characterized as substrates having a displaceable group or radical thereon. Such substrates include organic compounds having a displaceable halogen, particularly, chlorine, bromine or iodine, thereon, such as aryl, alkyl, cycloalkyl, alkyl-aryl, and other organo-halide compounds. Metal salts and particularly metal halide salts are also suitable. Particularly useful compounds are obtained by reacting transition metal halides with certain anionic intermediates. Reactions described hereinafter using

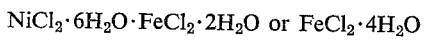

exemplify the use of such transition metal halides. It may be noted that the hydrated salts can be conveniently used since the alkali metal hydroxide or alkaline earth metal hydroxide can efficiently remove the water from the reaction mixture. Metalloid halides such as $GeCl_4$, $PCl_3$, etc. can also be used. Covalent hydrides such as $GeH_4$, $PH_3$, $AsH_3$, and analogous alkyl derivatives such as $CH_3PH_2$, $(CH_3)_2PH$, $CH_3GeH_3$, etc., also may be used. Carbonyl compound such as molybdenum hexacarbonyl can also be employed to react with cyclopentadienyl anion and the resultant anion further reacted, e.g., with methyl iodide to produce compounds such as σ-methyl-π cyclopentadienylmolybdenum tricarbonyl.

For example: By simply stirring powdered reagent grade KOH with solutions of the appropriate acids set forth in the table above in 1,2-dimethoxyethane, i.e., germane, ethylgermane, cyclopentadiene, indene, 9-phenylfluorene phosphine and fluorene, there can be prepared, in quantitative yield, solutions of the potassium salts of germane, ethylgermane, cyclopentadiene ($C_5H_6$), indene, 9-phenylfluorene and fluorene. The reactions are much easier and safer to carry out than the usual reactions of dispersed metal suspensions with weak acids. Using the solutions prepared from KOH as intermediates, a variety of derivatives, such as $CH_3GeH_3$, $CH_3GeH_2C_2H_5$, ferrocene, nickelocene, and bis-indenyliron(II), are prepared using reagents as shown by the following equations:

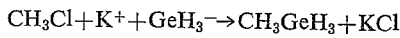
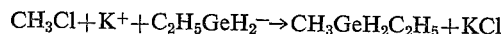
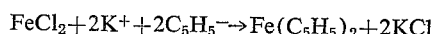
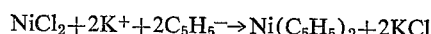
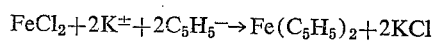

For materials which are insoluble in a solvent, such as water, but which solvent is miscible with the reaction medium solvent, the product can be precipitated simply by adding such a solvent to the reaction medium and the product recovered by filtration or phase separation and washing, followed by drying if necessary. Products may also be recovered by cooling to effect crystallization, evaporating the solvent and other methods known in the art.

Further details of the operation of the process of the invention will be set forth in the following illustrative examples.

At the outset, an alkali metal or alkaline earth metal hydroxide such as potassium hydroxide which is to be used for deprotonation of a weak acid must be finely pulverized. For this purpose, pellets of reagent grade potassium hydroxide (85% KOH) are quickly ground to a powder with a mortar and pestle and transferred for temporary storage to a tared wide-mouthed bottle which can be capped to prevent absorption of moisture by the potassium hydroxide. The potassium hydroxide should be ground sufficiently fine so that the largest particles are less than 0.5 mm. in diameter. The pulverization can be very easily carried out using a blendor type mixer-pulverizer. For example, 60 g. of KOH in 120 ml. of diglyme (the dimethyl ether of diethylene glycol) or other non-hydroxylic solvent is completely pulverized in three minutes in the blendor-mixer-pulverizer. The resulting slurry of potassium hydroxide can then be transferred through a wide-necked funnel into a suitable reaction vessel. However, some deprotonations can be conveniently carried out right in the blendor. By using a variable transformer, the stirring speed of the blendor may be conveniently adjusted. If the solvent employed for the pulverization of the alkali metal hydroxide or alkaline earth metal hydroxide is different from that employed in the synthesis, the solvent can be displaced by washing several times with the synthesis solvent.

EXAMPLE I

σ-Methyl-π-cyclopentadienylmolybdenum tricarbonyl

The fundamental reactions are as follows:

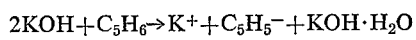

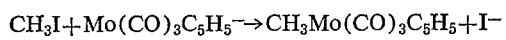

The $Mo(CO)_3C_5H_5^-$ anion may be converted to the hydride $HMo(CO)_3C_5H_5$ or to any of a series of derivatives, $RMo(CO)_3C_5H_5$ where R may be alkyl, cycloalkyl, etc. The preparation of the methyl compound is described here. Many other cyclopentadienylmolybdenum tricarbonyl derivatives are known and may be prepared by this method by substitution of other alkane, cycloalkyl and other organic iodides.

*Procedure.*—A 300-ml. 3-necked flask, equipped with a magnetic stirring bar and a connection from one side neck to a source of nitrogen, is charged with 150 ml. of 1,2-dimethoxyethane and 50 g. of potassium hydroxide powder. While slowly stirring the mixture, and while flushing the flask with a stream of nitrogen, 16.4 ml. (0.20 mole) of cyclopentadiene is added. Cyclopentadiene is obtained by the thermal cracking of dicyclopentadiene. Dicyclopentadiene is slowly distilled through a short fractionating column, collecting only that which refluxes below 44°. (Cyclopentadiene boils at 42.5°, dicyclopentadiene at 170°.) This cyclopentadiene must be used within two or three hours, or stored at −78° until use, because slow dimerization occurs at room temperature. The other side neck and the main neck of the flask are loosely stoppered, and when it is judged that 99% of the air has been flushed from the flask, the flask is tightly stoppered. The stirring rate is then increased as much as possible without causing undue splashing.

After one hour, the stopper in the side neck is removed and replaced with a coarse-porosity filter tube leading to the side neck of another 300-ml. 3-necked flask. The main neck of the receiver flask should be stoppered and the other side neck should be closed with a stopper having a stopcock permitting evacuation of the flask. The filtering apparatus is flushed with nitrogen, and the apparatus is slowly tipped so as to decant the red solution through the filter into the receiver flask. Occasional application of a vacuum through this stopcock will hasten the filtration. When about 130 ml. of the solution has collected in the receiver flask, the first flask is righted and about 25 ml. of dry 1,2-dimethoxyethane is added to wash the remaining potassium hydroxide. After collecting another 30 ml. of filtrate, the washing procedure is repeated. About 190 ml. of solution should be obtained.

In a fume hood, the main stopper of the flask containing the filtrate is removed, and, while the flask is flushed with nitrogen, 45 g. (0.17 mole) of molybdenum hexacarbonyl is added. (CAUTION: Molybdenum hexacorbonyl is somewhat volatile and extremely toxic.) The main neck of the flask is then fitted with a water-cooled reflux condenser. After the condenser has been flushed with nitrogen, the top of the condenser is connected to the source of nitrogen, and the side necks of the flask are stoppered. The mixture is refluxed, using an electrical heating mantle, for at least 12 hr. Carbon monoxide is evolved during this time, and it will escape through the mercury bubbler.

The resulting solution of $KMo(CO)_3C_5H_5$ is cooled to room temperature, the reflux condenser is replaced with a dropping funnel containing 12.5 ml. (0.20 mole) of methyl iodide, ($CH_3I$) or an equivalent amount of another organic iodide (RI) and a magnetic stirring bar is placed in the flask. During a 5-minute period, the methyl iodide is added dropwise to the stirred solution. Stirring is continued for five hours. Two necks of the flask are then stoppered and the third is fitted with a stopcock leading to a large solid carbon dioxide trap and a vacuum pump. While the solution is being stirred, the solvent is removed by evacuation at room temperature. (About 3–4 hours are required.)

After complete removal of the solvent, the stopcock is closed and the flask is placed in a nitrogen-flushed dry bag. The flask is opened, and the solid contents are scraped out and transferred to a large vacuum sublimation apparatus. (If a sufficiently large sublimation apparatus is not available, the sublimation may be accomplished batchwise using a smaller apparatus.) Using circulated ice-water in the condenser of the sublimation apparatus, the $CH_3Mo(CO)_3C_5H_5$ is sublimed using a bath temperature of 80–90° and a pressure less than 0.1 mm. The vacuum is broken with nitrogen, inasmuch as the residue is usually pyrophoric. The residue is discarded in a place where it may safely burn. Yield: 33–35.5 g. (75–80%) of yellow $CH_3Mo(CO)_3C_5H_5$, melting at 121–124° (dec.).

*Properties.*—In σ-methyl - π - cyclopentadienylmolybdenum tricarbonyl, the methyl group is attached to the molybdenum by a metal-to-carbon σ bond, and the cyclopentadienyl group is attached by π-type bonding as in sandwich compounds. The material forms yellow crystals, M.P. 124° (dec.), that are soluble in organic solvents and slowly oxidized by air. Purification is readily effected by vacuum sublimation.

EXAMPLE II

Biscyclopentadienyliron (ferrocene)

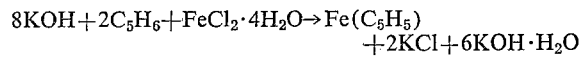

The present procedure is especially facile because of the simplified method of deprotonating cyclopentadiene and because ordinary hydrated iron (II) chloride may be used. The potassium hydroxide serves not only as a deprotonating agent, but also as a dehydrating agent.

*Procedure.*—A 300-ml. 3-necked flask, equipped with a magnetic stirring bar and a connection from one side neck to a source of nitrogen, is charged with 120 ml. of 1,2-dimethoxyethane and 50 g. of potassium hydroxide powder. While the mixture is slowly stirred, and while the flask is flushed with a stream of nitrogen, 11.0 ml. (0.134 mole) of cyclopentadiene is added. The other side neck is stoppered, and the main neck is fitted with a 100-ml. dropping funnel with its stopcock open. When it is judged that 99% of the air has been flushed from the flask, the stopcock is closed, and a solution of 13.0 g. (0.065 mole) of iron (II) chloride 4-hydrate in 50 ml. of dimethyl sulfoxide is placed in the dropping funnel. The iron (II) chloride should be pulverized in a mortar and pestle in order to aid dissolution. Dimethyl sulfoxide should not be allowed to contact the skin because it is absorbed very rapidly. Vigorous stirring for about an hour is required to effect dissolution of the salt. The vent tube in the mercury bubbler is lifted above the mercury surface so that the pressure within the reaction vessel is atmospheric. The mixture is stirred vigorously. After about 10 minutes of vigorous stirring, dropwise addition of the iron (II) chloride solution is begun. The rate of addition is adjusted so that the entire solution is added in 45 minutes. At this point, the stopcock of the dropping funnel is closed, and the stirring is continued for another 30 minutes. Then the flow of nitrogen is stopped, and the mixture is added to a mixture of 180 ml. of 6 M HCl and approximately 200 g. of ice. Some of the resulting slurry may be used to wash the residual material out the flask. After the slurry has been stirred for about 15 minutes, the precipitate is collected on a coarse sintered glass funnel and washed with four 25-ml. portions of water. Sometimes the filtrate is deep blue because of formation of the ferricinium ion. If desired, the latter may be reduced to a relatively impure form of ferrocene by the addition of tin (II) chloride. However this recovery is seldom worthwhile, because the amount of ferricinium ion seldom accounts for more than 4% of the total yield of ferrocene. The product is spread out on a large watch glass and allowed to air-dry overnight. Yield: 11.0–11.9 g. (89–98%) of ferrocene melting at 173–4°. Material prepared in this manner is quite satisfactory as an intermediate for subsequent syntheses. If an extremely pure product is desired, this material should be sublimed.

*Properties.*—Ferrocene forms orange crystals (M.P. 173–174°) which are soluble in most organic solvents but essentially insoluble in water. The compound readily sublimes at temperatures above 100°. The ultraviolet spectrum in ethanol or hexane shows maxima at 325 m$\mu$ ($\epsilon$=50) and 440 m$\mu$ ($\epsilon$=87), and rising short-wavelength absorption ($\epsilon$=5250 at 225 m$\mu$).

EXAMPLE III

Biscyclopentadienylnickel (nickelocene)

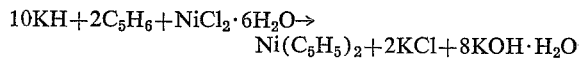

Most of the published methods for preparing nickelocene are analogous to methods used for preparing ferrocene. The following procedure is analogous to the preceding ferrocene procedure, except that some extra precautions are necessary in order to avoid oxidation of the product.

Many derivatives of nickelocene can be prepared. A particularly useful reaction is that between nickelocene and nickel tetracarbonyl, leading to $(C_5H_5NiCo)_2$ and $(C_5H_5)_3Ni_3(CO)_2$.

*Procedure.*—The procedure is identical to that described under the ferrocene procedure except for the following changes. Only 8.5 ml. (0.104 mole) of cyclopentadiene is used, and a solution of 11.9 g. (0.05 mole) of nickel (II) chloride 6-hydrate in 65 ml. of dimethyl sulfoxide is used instead of the iron (II) chloride solution. The 6 M HCl used in the precipitation step and the wash water are deaerated with a stream of nitrogen before use. The product is collected on a sintered glass funnel (in a nitrogen-filled glove bag), washed, and then dried overnight in vacuo (<0.1 mm. pressure). Yield: 5.2–5.4 g. (55–57%) of nickelocene melting at 173–4°. The melting point should be determined using a sample under a nitrogen atmosphere in a sealed capillary.

*Properties.*—Nickelocene forms dark green crystals (M.P. 173–174°) which are soluble in most organic solvents but essentially insoluble in water. The microcrystalline material formed in the above synthesis undergoes oxidation on standing in air and should be kept in an inert atmosphere. Purification can be effected by vacuum sublimation at 100°.

EXAMPLE IV

Methylphosphine

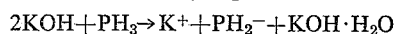

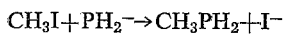

Both methylphosphine (this synthesis) and dimethylphosphine (the following synthesis) are considerably stronger Lewis bases than phosphine, and their reactions with various Lewis acids, including boranes, have been the subject of recent studies. Both methylphosphine and dimethylphosphine are readily oxidized by air and thus can serve as sources of methylphosphonous acid,

and dimethylphosphonic acid, $(CH_3)_2PO(OH)$.

The present method is essentially a deprotonation-methylation procedure wherein relatively easily-handled KOH-dimethyl sulfoxide suspensions are used.

*Procedure.*—CAUTION: Phosphine and methyl phosphine are toxic materials which must be handled with great care, using vacuum-line manipulation. Dimethyl sulfoxide should not be allowed to contact the skin because it is absorbed very rapidly.

A magnetic stirring bar, 30 g. of potassium hydroxide powder, and 40 ml. of dimethyl sulfoxide are placed in 200-ml. 3-necked round-bottomed flask with standard taper joints. One side neck is stoppered, the other is fitted with a small dropping funnel, and the main neck is fitted with an adapter connected to a 0–760 mm. manometer and a stopcock leading to a vacuum line. The joints are greased with silicone grease. The flask is thoroughly evacuated while the mixture is stirred, and the stopcock is then closed. About 0.012 mole of pure phosphine is transferred to a 300-ml. bulb connected to the vacuum line just beyond the stopcock, and the stopcock is opened so as to allow the phosphine to be absorbed by the stirred KOH suspension. The dimethyl sulfoxide becomes yellow because of the formation of the $PH_2^-$ anion. When the manometer indicates that about 99% of the phosphine has been absorbed (after about 25 minutes) the system is again thoroughly evacuated. The stopcock is closed, a solution of 1.0 ml. (0.016 mole) of methyl iodide in 10 ml. of dimethyl sulfoxide is placed in the dropping funnel, and a trap between the stopcock and the vacuum pump is immersed in liquid nitrogen.

About 2 ml. of the methyl iodide solution is added to the stirred mixture, and, after about ten seconds, the stopcock is opened for a minute. This process is repeated until the dimethyl sulfoxide solution is colorless. The crude methyl phosphine which collects in the liquid nitrogen-cooled trap is then purified by fractional condensation in traps cooled to $-112°$ ($CS_2$ slush), $-130°$ (n-pentane slush), and $-196°$ (liquid nitrogen). The material which collects in the $-112°$ and $-196°$ traps is discarded. About 0.009 mole (75% yield) of purified methyl phosphine collects in the $-130°$ trap.

*Properties.*—Methylphosphine is an evil-smelling material which is probably very poisonous. The vapor pressure may be represented by the equation log $$P_{mm} = 7.402 - 1158/T$$

where $T=°K$. The extrapolated boiling point is $-17.1°$, and the vapor pressures at $-78.5°$ (28 mm.), $-63.5°$ (73 mm.) and $-45.2°$ (210 mm.) may be used as criteria of purity.

The methylphosphine prepared by this procedure has a vapor pressure at $-78.5°$ (solid carbon dioxide slush) of 29 mm. The principal impurity is dimethyl ether, estimated by mass spectrometry and infrared spectrometry to amount to less than 1%.

EXAMPLE V

Dimethylphosphine

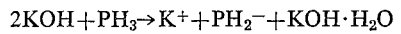
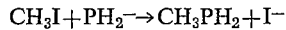
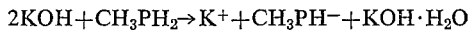
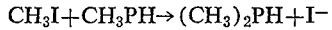

The following procedure is adaptable to the synthesis of 0.05 mole, or less, of dimethylphosphine.

*Procedure.*—The procedure is the same as that used for the preparation of methyl phosphine up to the point where the methyl iodide solution is added. A solution of 1.5 ml. (0.024 mole) of methyl iodide in 10 ml. of dimethyl sulfoxide is placed in the dropping funnel, and the stopcock connecting the system to the vacuum line is closed. Sufficient methyl iodide solution is added, during a period less than one minute, to decolorize the solution. If, during the addition, the pressure in the flask exceeds 600 mm. Hg the volume of the system should be increased by opening the stopcock to an evacuated volume of several hundred ml. so as to keep the pressure below 600 mm. Hg. However, the volume of the system should not be unduly expanded, or the deprotonation of the methyl phosphine will proceed too slowly. The slurry is vigorously stirred for an hour, during which time the pressure of methyl phosphine should markedly decrease. Then the remainder of the methyl iodide solution is added (leaving a drop of solution in the dropping funnel to ensure that air does not enter the flask), and stirring is continued for another half hour. The volatile material is collected in a liquid nitrogen-cooled trap and is then fractionally condensed in traps cooled to $-78°$ (solid carbon dioxide slush), $-112°$ ($CS_2$ slush) and $-196°$ (liquid nitrogen). The material which collects in the $-78°$ and $-196°$ traps is discarded. The dimethylphosphine in the $-112°$ trap usually contains an appreciable amount of methyl iodide as an impurity. However, this impurity may be readily eliminated by simply allowing the mixture to stand in the liquid state of $0°$ for about one hour, during which time the methyl iodide is converted to the relatively non-volatile salt, $(CH_3)_3PHI$. About 0.0078 mole (65% yield) of purified dimethylphosphine remains.

*Properties.*—Like methylphosphine, dimethylphosphine has a disgusting odor and is probably very poisonous. The vapor pressure may be represented by the equation $\log P_{mm} = 7.539 - 1370/T$, where $T = °K$. The extrapolated boiling point is $21.1°$, and the vapor pressure at $0°$ (338 mm.) may be used as a criterion of purity. Dimethylphosphine prepared by this procedure has a vapor pressure at $0°$ of 339 mm.

Dimethylphosphine can be converted to trimethyl phosphine by treatment with excess methyl iodide at $0°$ to form $(CH_3)_3PHI$, followed by reaction with KOH to liberate the $(CH_3)_3P$. The latter step is readily accomplished by adding a dimethyl sulfoxide solution of $(CH_3)_3PHI$ to a slurry of KOH in dimethyl sulfoxide in vacuo.

EXAMPLE VI

Methylgermane

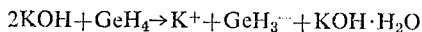
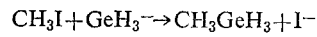

As in the case of alkylphosphines (see the preceding two syntheses) alkylgermanes are generally prepared by either of two methods—a method based on the deprotonation and subsequent alkylation of germane, and a method based on the reduction of germanium-halogen bonds with $LiAlH_4$ or hydroborates. In view of the ease of preparation of germane and the simple KOH deprotonation procedure, the deprotonation-alkylation method of the present invention is believed to be superior and is described here for the synthesis of methylgermane. In this procedure, 1,2-dimethoxyethane is used as solvent.

*Procedure.*—Potassium hydroxide powder (2.8 g.) and 10 ml. of 1,2-dimethoxyethane are placed in a 50-ml. round-bottomed flask with a standard taper neck. The flask is fitted with an adapter having a stopcock for connecting to the vacuum line. With the flask in a $-78°$ bath (solid carbon dioxide slush), the mixture is degassed by pumping for about 5 minutes. Then the $-78°$ bath is replaced with a $-196°$ bath (liquid nitrogen), and the reactor is thoroughly evacuated. About 0.002 mole of pure germane is condensed into the reactor, and the stopcock is closed. The reactor is warmed in air to room temperature and is shaken for a half hour. The shaking should be very vigorous in order to increase the surface area of the solution as much as possible. The reactor is then placed in a $-196°$ bath and the very small amount of hydrogen gas (from the slow decomposition of potassium germyl) is pumped out. Approximately 0.003 mole of methyl iodide is condensed into the reactor. The reactor is allowed to warm up to about $15°$ in air, while shaking occasionally, whereupon a white precipitate forms. This precipitate is difficult to see in the presence of the potassium hydroxide. Then the reactor is immediately quenched in a $-78°$ bath. If the reaction mixture is allowed to stand after formation of the precipitate, secondary reactions yielding dimethylgermane and dimethyl ether occur. With the reactor in series with $-78°$ and $-196°$ traps, it is allowed to warm in air. Half or more of the 1,2-dimethoxyethane is allowed to distill into the $-78°$ trap. The crude methylgermane which collects in the $-196°$ trap is purified by fractional condensation in traps cooled to $-130°$ (n-pentane slush), $-160°$ (isopentane slush) and $-196°$. The material which collects in the $-160°$ trap is pure methylgermane. A yield of about 0.0016 mole (80%) is obtained.

*Properties.*—The vapor pressure of methylgermane may be represented by the equation $$\log P_{mm} = 3.9624 - 0.003034T + 1.75 \log T - 1080.3/T$$

from which one calculates a boiling point of $-34.1°$. The vapor pressures at $-83.9°$ (ethylacetate slush), $-78.5°$ (Dry Ice slush), and $-63.8°$ (chloroform slush) are 46.3 mm., 67.7 mm. and 169.4 mm., respectively. Although toxicity data are unavailable, methylgermane should probably be handled as if it were a very toxic gas.

The methylgermane prepared by this procedure has vapor pressure of 46 mm. at the ethyl acetate slush temperature and 168 mm. at the chloroform slush temperature.

While there has been described in the foregoing what may be considered to be preferred embodiments of the invention, modifications may be made therein without departing from the teachings of the invention and it is intended to cover all such as fall within the scope of the appended claims.

What is claimed is:

1. In a process for producing a derivative of a weakly acidic chemical compound, the steps comprising:

(a) producing a solution of said weakly acidic chemical compound in a solvent selected from the group consisting of dimethyl, diethyl and methyl-ethyl ethers, diethylene glycol dimethyl ether, dimethoxy-ethane, diethoxy-ethane, ethoxy-methoxy-ethane, dimethyl sulfoxide, hexamethyl-phosphoramide, dimethyl formamide, and diethyl-formamide, said weakly acidic chemical compound having an acid strength, pKa, in the range of about 12 to at least about 31 in said solvent;

(b) contacting said solution with a stoichiometric excess of finely-divided solid particulate potassium hydroxide phase to react with said weakly acidic chemical compound to remove a proton therefrom yielding an anion of said compound and a cation of said potassium hydroxide in the solution whereupon said proton combines with a hydroxide ion of said solid potassium hydroxide forming water which then associates with said solid potassium hydroxide phase; and (c) then adding a substrate having a displaceable substituent group thereon to react with said anion of the weakly acidic chemical compound to produce a derivative thereof in said solution.

2. A process as defined in claim 1 wherein said weakly acidic chemical compound is selected from the group consisting of cyclopentadiene, 9-phenylfluorene, indene, fluorene, $GeH_4$, phosphine and $C_2H_5GeH_3$.

3. A process as defined in claim 2 wherein said weakly acidic compound is cyclopentadiene; wherein said operation of contacting said solution with the solid KOH particle phase is conducted in an inert gas atmosphere, wherein said solvent is 1,2-dimethoxyethane and wherein a solution containing $C_5H_5^-$, cyclopentadienyl anion, is formed;

wherein said solution containing cyclopentadienyl anion is separated from the solid KOH phase;

wherein molybdenum hexacarbonyl is added to said solution and the solution is heated to reflux temperature to form $KMo(CO)_3C_5H_5$ therein with the evolution of CO;

wherein an iodide compound, RI, wherein R is an alkyl radical is added to said refluxed solution at room temperature to react with the $KMo(CO)_3C_5H_5$ to form a compound represented by the formula $$RMo(CO)_3C_5H_5$$

and wherein said compound $RMo(CO)_3C_5H_5$ is recovered from said solution.

4. A process as defined in claim 2 wherein said weakly acidic compound is cyclopentadiene;

wherein said solvent is 1,2-dimethoxyethane;

wherein said operation of contacting the solution with said solid KOH phase is conducted in an inert atmosphere and wherein a solution containing $C_5H_5^-$ anion is formed;

wherein a transition metal halide salt dissolved in dimethyl sulfoxide is added to said solution to react with said $C_5H_5^-$ anion and form a compound therewith, and wherein there is included a further operation of adding cold aqueous acid to said solution to precipitate said compound formed with said $C_5H_5^-$ anion and said transition metal, which precipitate is then separated from the solution.

5. A process as defined in claim 4 wherein said transition metal halide is iron (II) chloride 4-hydrate, wherein said cold aqueous acid solution is cold hydrochloric acid, and wherein said compound which is formed is ferrocene.

6. A process as defined in claim 4 wherein said transition metal halide is nickel (II) chloride 6-hydrate, wherein said cold aqueous acid solution is cold hydrochloric acid solution, and wherein said compound which is formed is nickelocene.

7. A process as defined in claim 2 wherein said weakly acidic compound is phosphine; wherein said solvent is dimethyl sulfoxide; wherein said operation of contacting the solution with solid KOH phase is conducted in an evacuated environment and wherein a solution containing $PH_2^-$ anion is formed;

wherein a solution of methyl iodide in dimethyl sulfoxide is added to the solution to react with the $PH_2^-$ anion in a vacuum environment to form methyl phosphine which vaporizes from the solution; and said process includes the further operation of collecting the methyl phosphine which vaporizes from the solution.

8. A process as defined in claim 2 wherein said weakly acidic compound is phosphine; wherein said solvent is dimethyl sulfoxide; wherein said operation of contacting the solution with solid KOH is conducted in an evacuated environment and wherein a solution containing $PH_2^-$ anion is formed;

wherein a solution of methyl iodide in dimethyl sulfoxide is added to the solution to react with the $PH_2^-$ anion in a reduced pressure environment below about 600 mm. Hg so that the methylphosphine produced is retained in the solution and reacts further to form dimethyl phosphine in the solution; and wherein said process includes the further operation of vaporizing and collecting the dimethyl phosphine from the solution.

9. A process as defined in claim 2, wherein said solvent is 1,2-dimethoxyethane; wherein said weakly acidic compound is $GeH_4$; wherein said operation of contacting the solution with solid KOH phase is conducted in an evacuated environment and wherein a solution containing $GeH_3^-$ anion is formed with the evolution of hydrogen;

wherein methyl iodide is added to the solution to react with said $GeH_3^-$ therein to produce a precipitate therein;

wherein the solution is cooled with the precipitate therein to minimize secondary reactions; and wherein the $CH_3GeH_3$ is vaporized from the solution and is collected.

References Cited

UNITED STATES PATENTS

| | | | |
|---|---|---|---|
| 2,848,506 | 8/1958 | Breslow | 260—665 |
| 2,898,360 | 8/1959 | Hogan et al. | 260—439 |
| 3,028,404 | 4/1962 | Pearson et al. | 260—429 |
| 3,057,899 | 10/1962 | Lindstrom | 260—439 |
| 3,462,507 | 8/1969 | Kahn | 260—665 |

OTHER REFERENCES

Gutmann, Coordination Chemistry in Non-Aqueous Solutions, Springer-Verlag, Vienna, 1960, p. 159.

TOBIAS E. LEVOW, Primary Examiner

A. P. DEMERS, Assistant Examiner

U.S. Cl. X.R.

23—360; 260—439, 440, 500, 606.5, 665